United States Patent
Kataoka et al.

(10) Patent No.: US 8,151,963 B2
(45) Date of Patent: Apr. 10, 2012

(54) POWER TRANSMITTING APPARATUS

(75) Inventors: Makoto Kataoka, Shizuoka (JP); Shinji Furuhashi, Shizuoka (JP); Shunichi Itou, Shizuoka (JP)

(73) Assignee: Kabushiki Kaisha F.C.C., Shizuoka (JP)

( * ) Notice: Subject to any disclaimer, the term of this patent is extended or adjusted under 35 U.S.C. 154(b) by 719 days.

(21) Appl. No.: 12/210,071

(22) Filed: Sep. 12, 2008

(65) Prior Publication Data

US 2009/0071792 A1    Mar. 19, 2009

(30) Foreign Application Priority Data

Sep. 12, 2007   (JP) ................................. 2007-236489

(51) Int. Cl.
*F16D 43/20* (2006.01)
*F16D 13/56* (2006.01)

(52) U.S. Cl. ................. 192/54.5; 192/70.23; 192/89.26; 192/109 R

(58) Field of Classification Search ................. 192/54.5, 192/70.23, 89.26
See application file for complete search history.

(56) References Cited

U.S. PATENT DOCUMENTS

| | | | | |
|---|---|---|---|---|
| 3,730,314 A | * | 5/1973 | Herr et al. | 192/54.51 |
| 7,191,882 B2 | * | 3/2007 | Kataoka et al. | 192/54.5 |
| 2005/0150736 A1 | | 7/2005 | Kataoka et al. | |

FOREIGN PATENT DOCUMENTS

| | | |
|---|---|---|
| JP | 58-069145 | 5/1983 |
| JP | 59-219525 | 12/1984 |
| JP | 59-231217 | 12/1984 |
| JP | 62-072927 | 4/1987 |
| JP | 08-049728 | 2/1996 |
| JP | 2005-325993 | 11/2005 |

OTHER PUBLICATIONS

European Search Report for EP Application No. 08105210. Applicant: Kabushiki Kaisha F.C.C. Search Report Dated Feb. 4, 2010.

\* cited by examiner

*Primary Examiner* — Rodney Bonck
(74) *Attorney, Agent, or Firm* — Knobbe, Martens, Olson & Bear, LLP

(57) ABSTRACT

A power transmitting apparatus can comprise a clutch housing rotatable together with an input member and supporting a plurality of driving clutch plates. A clutch member can support a plurality of driven clutch plates alternately arranged between the driving clutch plates via spline fitting and connected to an output member. A pressure member can be mounted on the clutch member so as to be axially movable therealong so as to accommodate pressure-contact and release of the driving clutch plates and the driven clutch plates. Back-torque limiting cams can be configured to release the connection between the driving clutch plates and the driven clutch plates when the rotation speed of the output member has exceeded that of the input member. A rotational force input to the input member can be transmitted to the output member by pressure-contacting the driving clutch plates and the driven clutch plates. The power transmitting apparatus can also comprise a limiting device for limiting a movement of the pressure member toward a direction away from the clutch member.

8 Claims, 9 Drawing Sheets

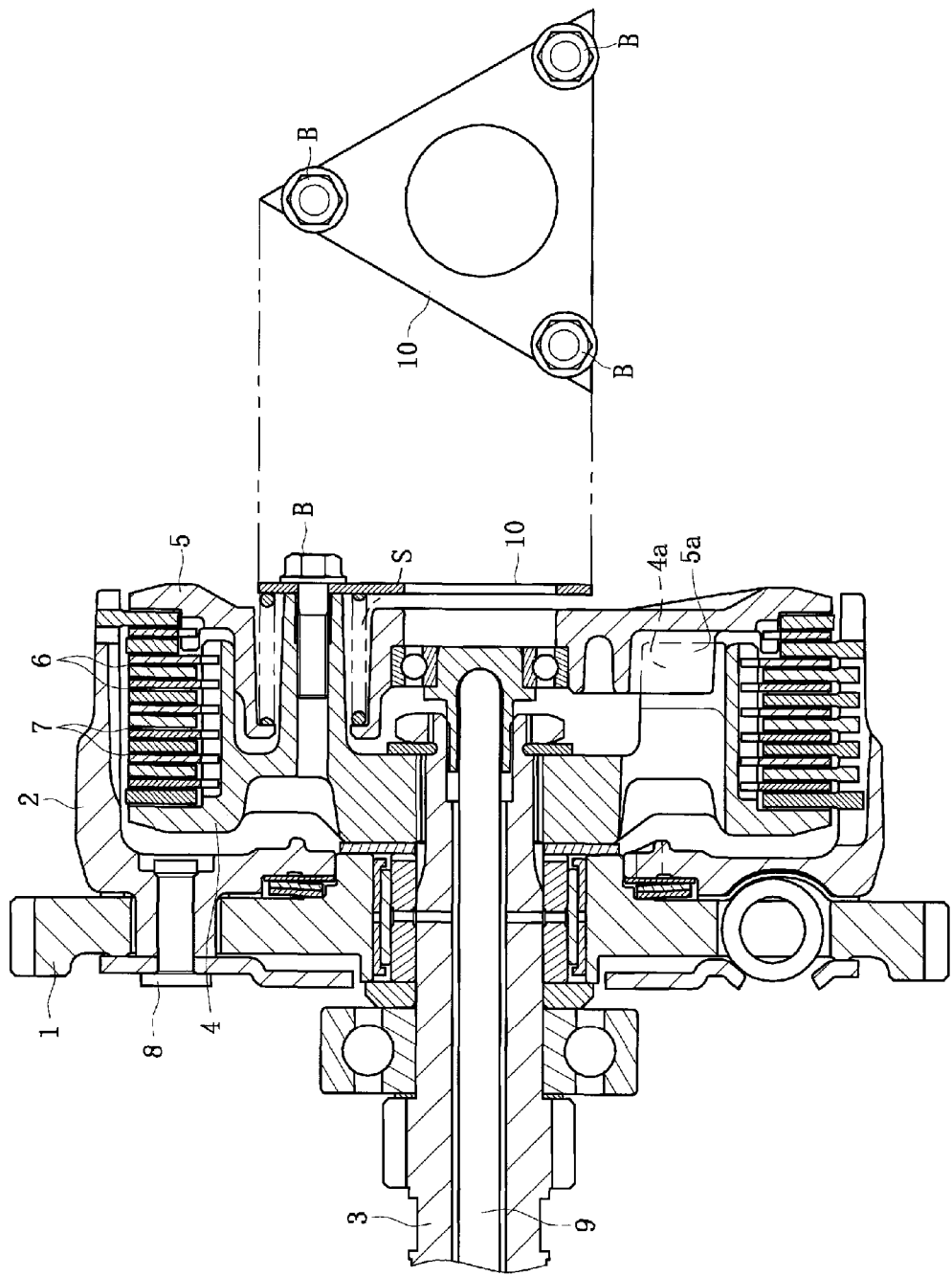
[Fig. 1]

[Fig 2]
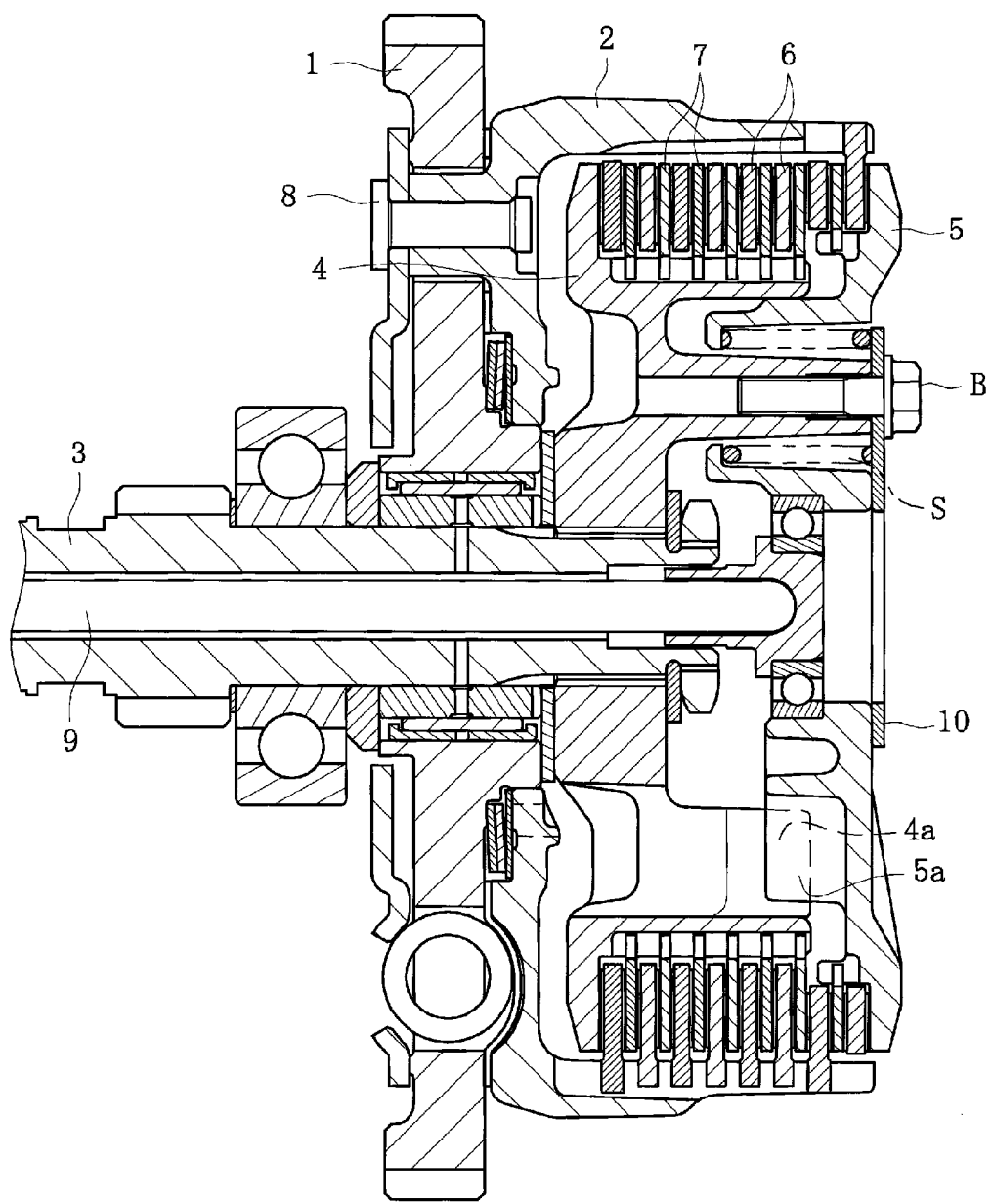

[Fig 3]
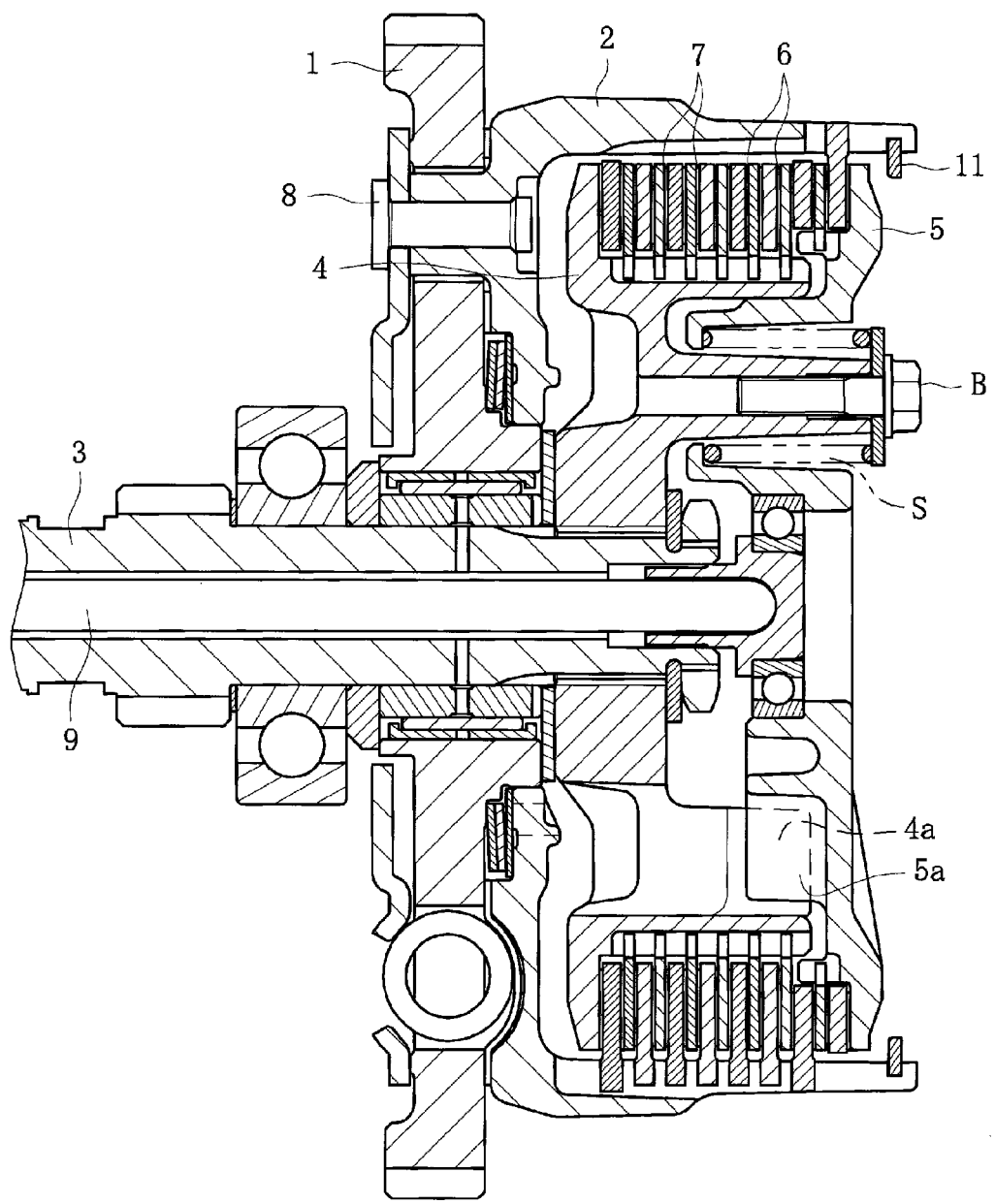

[Fig 4]
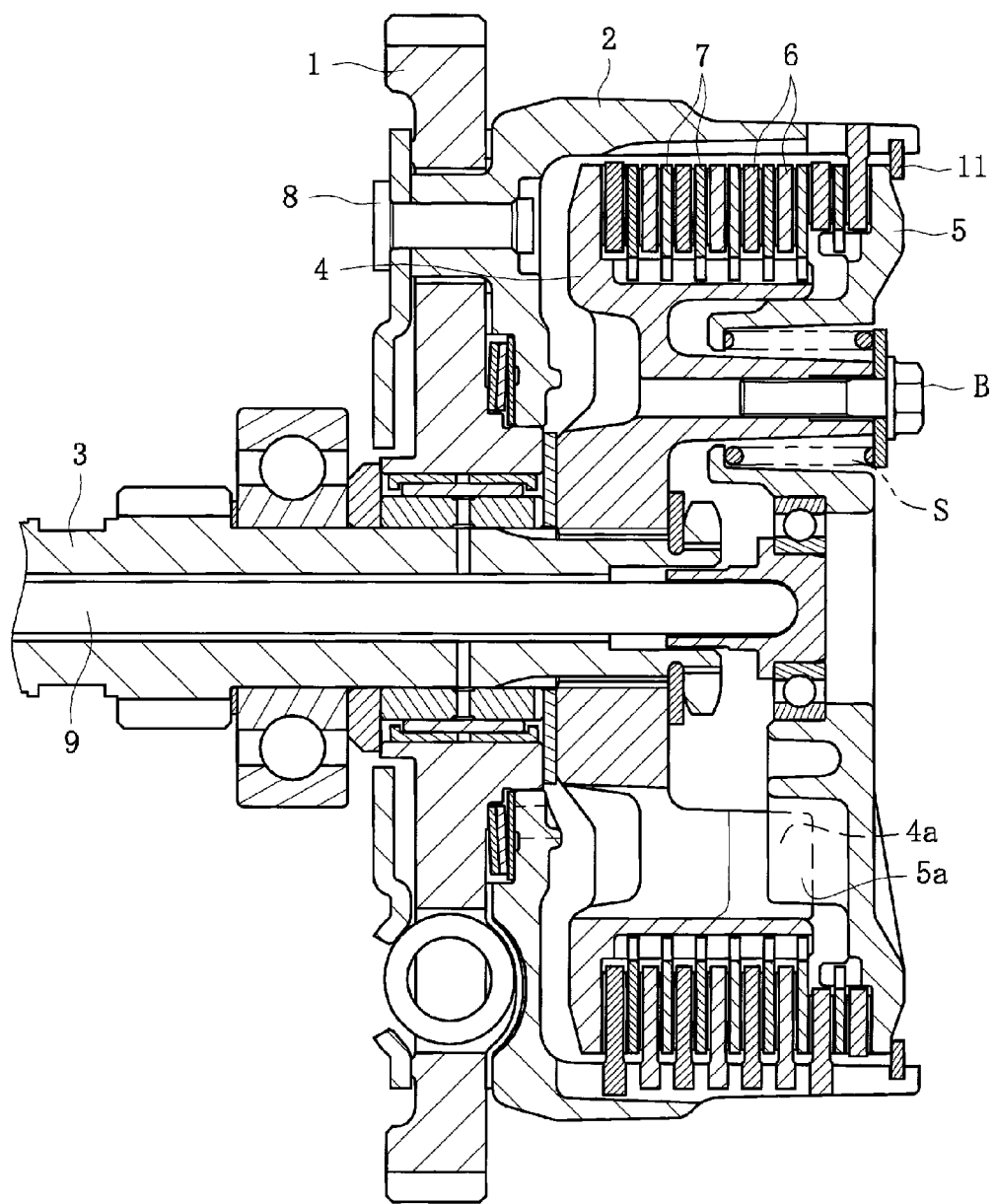

[Fig 5]
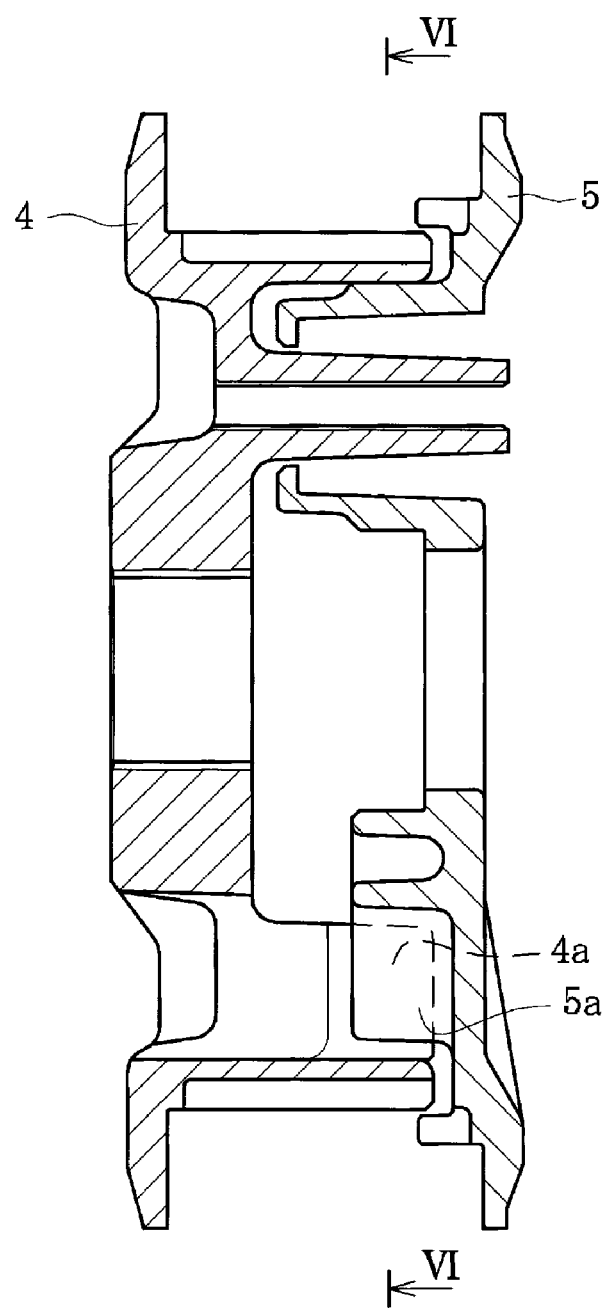

[Fig 6]
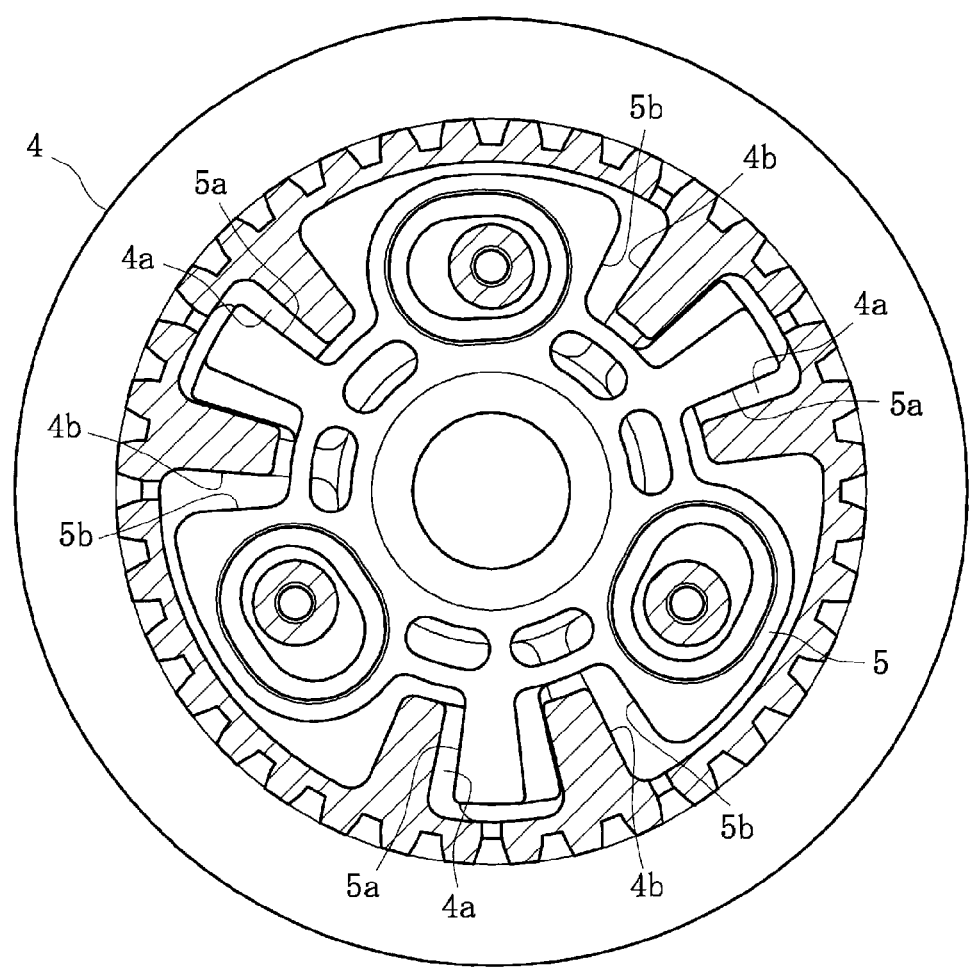

[Fig 7]
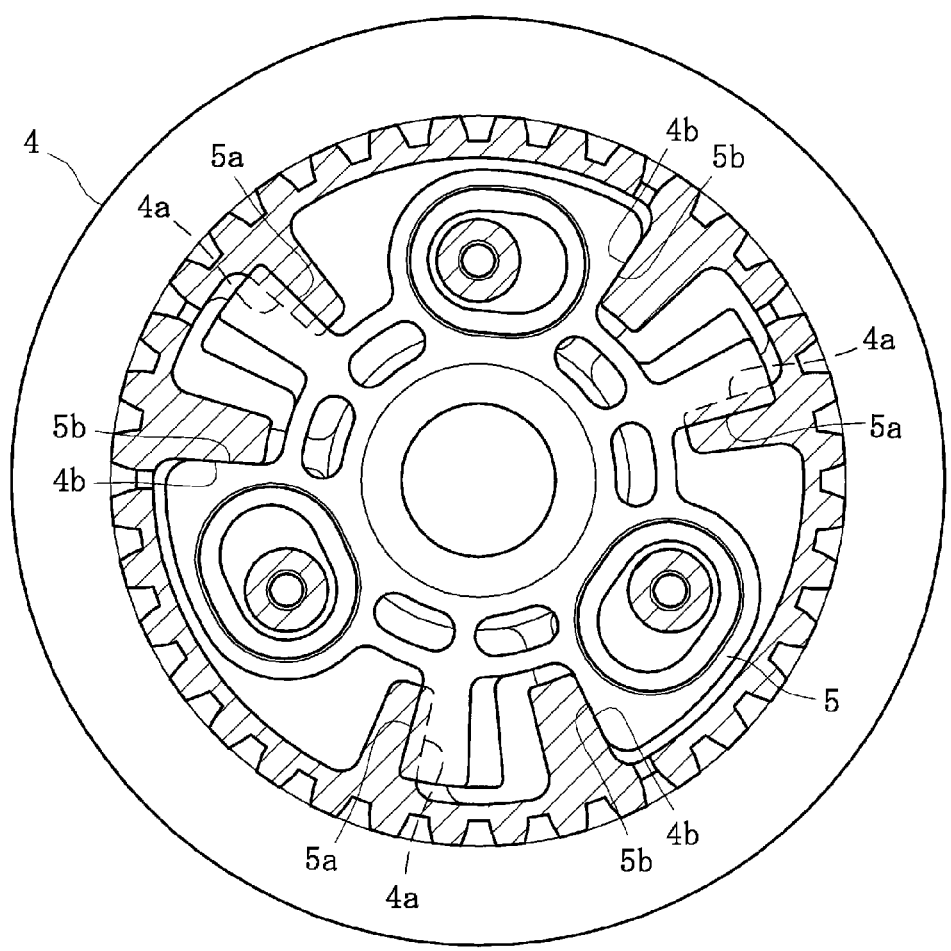

[Fig 8]
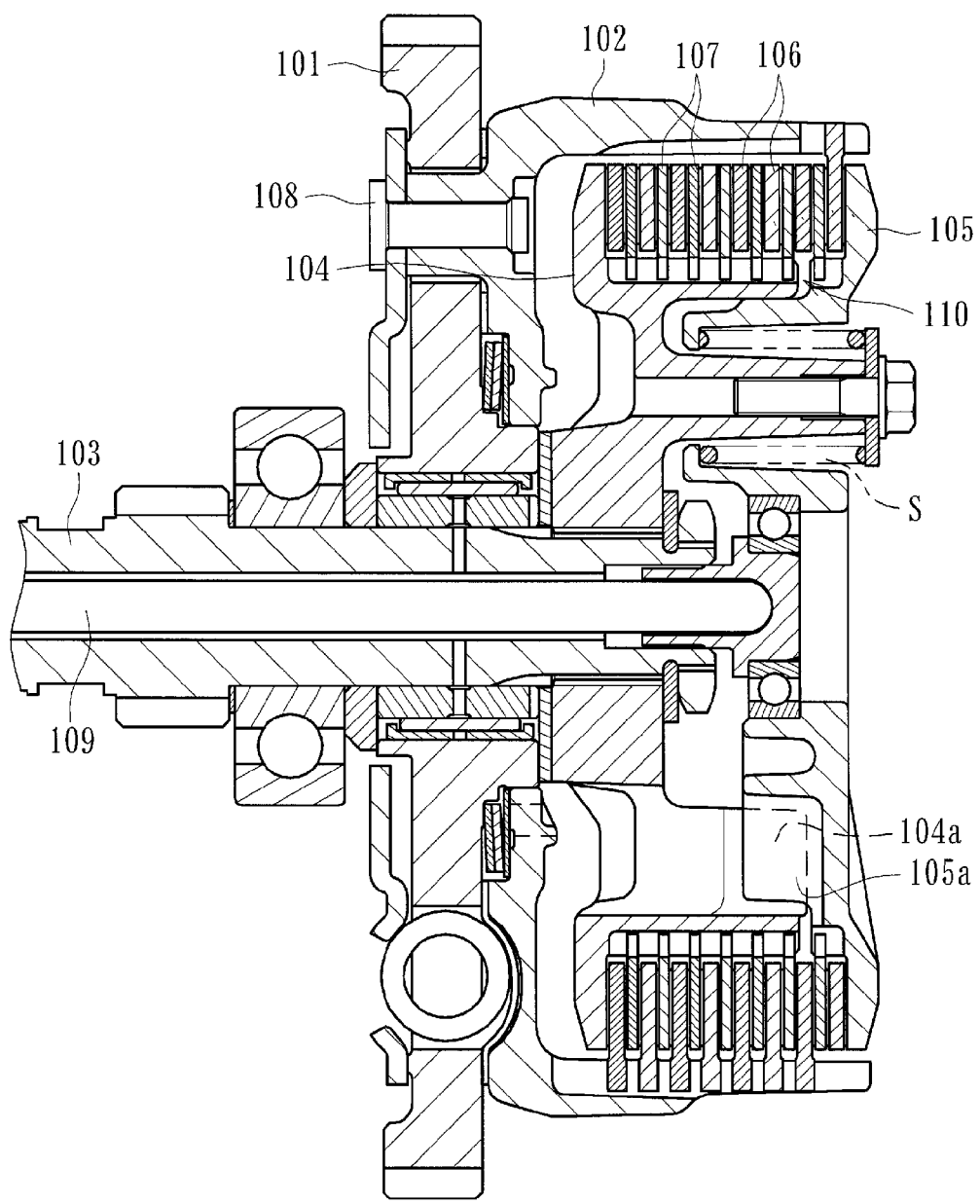

[Fig 9]
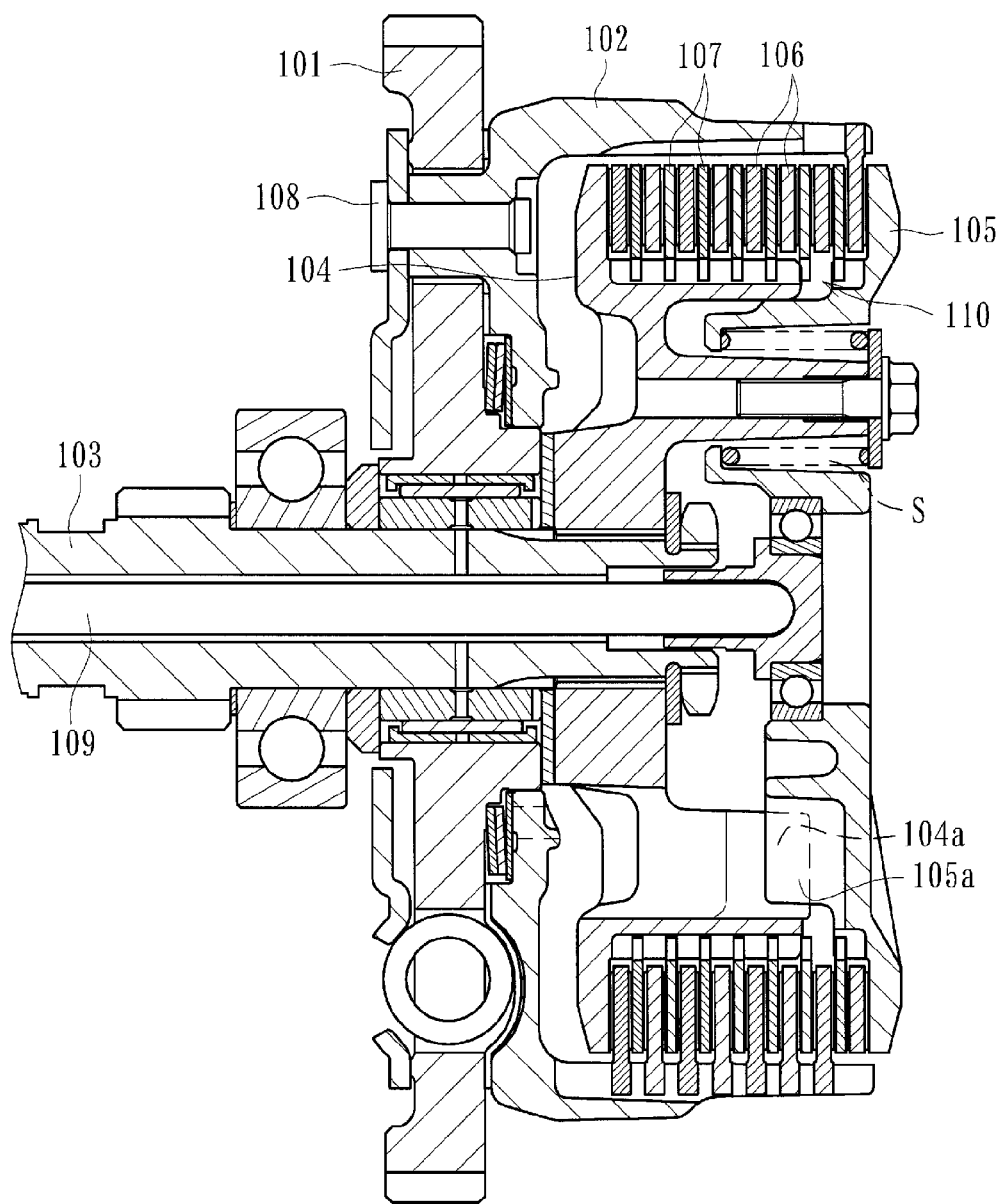

POWER TRANSMITTING APPARATUS

PRIORITY INFORMATION

The present application is based on and claims priority under 35 U.S.C. §119(a-d) to Japanese Patent Application No. 2007-236489, filed on Sep. 12, 2007, the entire contents of which is expressly incorporated by reference herein.

BACKGROUND OF THE INVENTIONS

1. Field of the Inventions

The present inventions relate to a power transmitting apparatus for transmitting or cutting-off a rotational force of the input member to the output member.

2. Description of the Related Art

In general, the power transmission apparatuses for motorcycles are intended to arbitrarily transmit or cut off a power of an engine to a transmission and a driving wheel. In other words, such transmissions are designed to allow the transmission or cutting off of power at any time, for example during a gear change. Such transmissions typically comprise an input member connected to an engine side, an output member connecting the transmission to a driving wheel side, and a clutch member connected to the output member. The power can be transmitted by pressure-contacting (pressing together) a plurality of driving clutch plates and cut-off by releasing the pressure-contacting force between the driving clutch plates and driven clutch plates.

For example, a power transmission apparatus can comprise, as shown in FIGS. 8 and 9, a clutch housing 102 on which a gear 101 is formed, a clutch member 104 connected to a shaft 103 as an output member, a pressure member 105 mounted on the clutch member 104 at the right side thereof, driving clutch plates 106 connected to the clutch housing 102, and driven clutch plates 107 connected to the clutch member 104.

As illustrated in FIGS. 8 and 9, a known power transmitting apparatus includes a two-part structure in which some of the driven clutch plates 107 are supported on the clutch member 104 and the other driven clutch plates 107 are supported on the pressure member 105. That is, the driven clutch plates 107 are supported both by a spline fitting portion 104a formed on the clutch member 104 and by a spline fitting portion 105a formed on the pressure member 105.

It is well known that the power transmission is carried out by pressure-contacting the driving clutch plates 106 and the driven clutch plates 107 each other by moving the pressure member 105 to the left direction as shown in FIG. 8 and the power transmission is cut off by releasing the pressure-contacting force between the driving clutch plates 106 and driven clutch plates 107. This type of arrangement is well known prior art.

SUMMARY OF THE INVENTIONS

An aspect of at least one of the embodiments disclosed herein includes solutions to the problem that the clutch member 104 and the pressure member 105 can be inadvertently disconnected from each when the pressure member 105 is axially moved too far toward the right direction (FIG. 9), for example, when releasing the driving clutch plates 106 and the driven clutch plates 107 in order to cut off the power transmission therebetween. If the pressure member 105 is disengaged from the clutch member 104, the power transmission and power cutting-off functions of the power transmitting apparatus could not be performed thereafter.

This problem can happen more often in power transmitting apparatuses having a back-torque limiting cams. Such cams are illustrated in FIGS. 8 and 9 and can be formed as tapered surfaces configured to absorb a back-torque caused by moving (lifting) the pressure member 105 toward a direction for releasing the pressure-contact between the driving clutch plates 106 and the driven clutch plates 107. As such, the axial movement of the pressure member 105 can be sometimes larger than a predetermined amount during the movement (lifting) caused by the back-torque limiting cam and thus the pressure member 105 can be disengaged from the clutch member 104.

Thus, in accordance with an embodiment, a power transmitting apparatus can comprise a clutch housing rotatable together with an input member and supporting a plurality of driving clutch plates. A clutch member can support a plurality of driven clutch plates alternately arranged between the driving clutch plates via spline fitting and connected to an output member. A pressure member can be mounted on the clutch member so as to be axially movably therealong and can be configured to provide pressure-contact and release between the driving clutch plates and the driven clutch plates. Back-torque limiting cams can be configured to release the connection between the driving clutch plates and the driven clutch plates when the rotation speed of the output member exceeds that of the input member. A rotational force input to the input member can be transmitted to the output member by pressure-contacting driving clutch plates and the driven clutch plates and the rotational force input to the input member can be cut-off from the output member by releasing the driving clutch plates and the driven clutch plates from each other. Additionally, the power transmitting apparatus can comprise means for limiting a movement of the pressure member toward a direction away from the clutch member.

In accordance with another embodiment, a power transmitting apparatus can comprise a clutch housing rotatable together with an input member and supporting a plurality of driving clutch plates. A clutch member can support a plurality of driven clutch plates alternately arranged between the driving clutch plates via spline fitting and connected to an output member. A pressure member can be mounted on the clutch member so as to be axially movably therealong and configured to provide pressure-contact and release between the driving clutch plates and the driven clutch plates. Back-torque limiting cams can be configured to release the connection between the driving clutch plates and the driven clutch plates when the rotation speed of the output member exceeds that of the input member. A rotational force input to the input member can be transmitted to the output member by pressure-contacting driving clutch plates and the driven clutch plates and the rotational force input to the input member can be cut-off from the output member by releasing the driving clutch plates and the driven clutch plates from each other. Additionally, the power transmitting apparatus can comprise a retainer positioned to limit a movement of the pressure member toward a direction away from the clutch member.

BRIEF DESCRIPTION OF THE DRAWINGS

Additional advantages and features of the present inventions are apparent from the subsequent description and the appended claims, taken in conjunction with the accompanying drawings, wherein:

FIG. 1 is a longitudinal section view of a power transmitting apparatus of a first embodiment, in a state before lifting of the pressure member;

FIG. 2 is a longitudinal section view of a power transmitting apparatus of the first embodiment, after lifting of the pressure member;

FIG. 3 is a longitudinal section view of a modification of the power transmitting apparatus of a first embodiment, before lifting of the pressure member;

FIG. 4 is a longitudinal section view of a modification of the power transmitting apparatus of the first embodiment, after lifting of the pressure member;

FIG. 5 is a longitudinal section view of a power transmitting apparatus of a second embodiment, in a state before lifting of the pressure member;

FIG. 6 is a sectional view taken along a line VI-VI in FIG. 5 showing a condition before lifting of the pressure member;

FIG. 7 is a sectional view similar to FIG. 6 showing a condition after lifting of the pressure member;

FIG. 8 is a longitudinal section view of a power transmitting apparatus of a prior art before lifting of the pressure member; and FIG. 9 is a longitudinal section view similar to FIG. 8 after lifting of the pressure member.

DETAILED DESCRIPTION OF THE PREFERRED EMBODIMENT

With reference to FIGS. 1 and 2, a power transmitting apparatus of a first embodiment can be mounted on a vehicle such as a motorcycle to arbitrarily transmit or cut off the driving force of an engine to a transmission or a driving wheel. As shown in FIGS. 1 and 2, the power transmitting apparatus can comprise a clutch housing 2 on which a gear 1, which can serve as an input member, is mounted. A clutch member 4 can be connected to a shaft 3, which can serve as an output member. A pressure plate 5 can be mounted on the clutch member 4 at its right end (in view of FIG. 1) thereof, with driving clutch plates 6 connected to the clutch housing 2, and driven clutch plates 7 connected to the clutch member 4.

The gear 1 is rotated around the shaft 3 by a driving force (rotational force) transmitted from the engine and is connected to the clutch housing 2 via rivets 8 etc. The clutch housing 2 can be a cylindrical casing member opened at the right end thereof and provided with a plurality of driving clutch plates 6 on the inner circumferential wall thereof. Each of the driving clutch plates 6 can be formed as a substantially annular plate member and adapted to be rotated together with the clutch housing 2 and also to slide axially thereon.

The clutch member 4 can be formed as a cylindrical casing member opened at the right end thereof and adapted to be received within the clutch housing 2. The shaft 3 passes through the center of the clutch member 4 and is connected thereto via a spline connection and thus is rotated by the clutch member 4. An axially extending spline arrangement (spline fitting portion) can be formed on the outer circumferential surface of the clutch member 4. The driven clutch plates 7 can be fitted on the spline fitting portion.

For example, the spline can be formed by alternately arranged projections and grooves around the outer circumferential surface of the clutch member 4. A central bore of each driven clutch plate 7 can be formed with projections and grooves corresponding to those of the clutch member 4 and can be fitted on the clutch member so that the driven clutch plate 7 can axially slide on the clutch member 4 but cannot rotate relative to the clutch member 4.

These driven clutch plates 7 (including driven clutch plates 7 spline fitted on the pressure member 5) are arranged alternately with the driving clutch plates 6 so that mutually adjacent clutch plates 6 and 7 can be pressure-contacted and released. That is, both clutch plates 6 and 7 are allowed to slide axially respectively on the clutch housing 2 and the clutch member 4 and thus pressure-contact each other when pushed by the pressure plate 5 toward a left direction as shown in FIG. 1. When pressed as such, the rotational force can be transmitted from the clutch housing 2 to the clutch member 4 and the shaft 3. On the contrary, when the pressure of the pressure plate 5 is released, the clutch plates 6 and 7 are also released from each other and thus the clutch member 4 does not follow the rotation of the clutch housing 2 and can stop relative to the clutch housing 2 so that no power is transmitted to the shaft 3, as shown in FIG. 2.

In this case, it should be noted that "release" of the clutch plates 6 and 7 means a condition in which the pressure-contact is lost and thus the clutch member 4 can rotate relative to the clutch housing 2 (i.e. a condition in which the driving clutch plates 6 slide relative to the driven clutch plates 7). In this "released" condition, there may or may not be measureable clearance between the clutch plates 6 and 7.

The pressure plate 5 can be arranged at a position closing the opening (the right end) of the clutch member 4 and can be normally urged toward a left direction by the clutch spring S. The circumferential edge portion of the pressure plate 5 can abut the clutch plate 6 positioned at most right position and the clutch plates 6 and 7 can be normally pressure-contacted each other by the clutch spring S. Accordingly, the clutch housing 2 and the clutch member 4 are kept in a normally connected condition so that the gear 1 can rotate the shaft 3 when the rotational force is input to the gear 1. A reference character "B" in the drawings denotes a bolt screwed into a boss portion projected from the clutch member 4.

An axially extending push rod 9 can be arranged within the shaft 3. The pressure-contact force between the driving and driven clutch plates 6 and 7 can be released when a driver of vehicle operates a push rod 9 to move it toward a right direction (in view of FIG. 1) so as to move the pressure plate 5 toward a right direction against the urging force of the clutch spring S.

When the pressure-contacting force between the driving and driven clutch plates 6 and 7 is released, the rotational force input to the gear 1 and the clutch housing 2 is cut-off and thus is not be transmitted to the shaft 3. That is, the pressure-contact or the release between the plates 6 and 7 can be performed by the axial movement of the push rod 9 and accordingly the pressure plate 5.

The clutch member 4 and the pressure member 5 are respectively formed with cam surfaces 4a, 5a which are oppositely arranged and pressure-contacted and separated from each other for forming a pressure-contact assisting cam and a back-torque limiting cam. Under a condition in which the rotation force input to the gear 1 and the clutch housing 2 is transmitted to the shaft 3 via the clutch member 4, the rotation force is applied to the pressure member 5 and thus a force increasing the pressure-contacting force between the driving clutch plates 6 and the driven clutch plates 7 by the action of the pressure-contact assisting cam.

On the other hand, when the rotational speed of the shaft 3 exceeds that of the clutch housing 2 and the back-torque is generated in the power transmitting apparatus, the pressure member 5 is moved by the back-torque limiting cam to release (separate) the driving clutch plates 6 and the driven clutch plates 7. Thus some troubles which would otherwise be caused on the power transmitting apparatus and the power source (e.g. engine) can be avoided.

With continued reference to FIGS. 1 and 2, according to some embodiments, the power transmitting apparatus can comprise a stopper 10, which can serve as a limiting means for limiting a movement of the pressure member 5 in a direction away from the clutch member 4. The stopper 10 can be formed by a bearing plate bearing against one end of the clutch springs "S" commonly urging the pressure member 5 toward the clutch member 4 and further abutting against the pressure member 5 to limit a further axial movement of the pressure member 5 when the pressure member 5 is axially moved a predetermined distance toward the right direction (FIG. 2).

As shown in FIG. 1, the stopper 10 comprises a bearing plate of a substantially triangular configuration secured to the clutch member 4 by three bolts "B" and adapted to limit a further axial movement of the pressure member 5. As such, the bearing plate can abut against the pressure member 5 when the pressure member 5 is axially moved a predetermined distance (FIG. 2). Thus the stopper 10 can serve the dual functions of a bearing plate (washer) for the clutch springs "S" and the limiting means for limiting the axial movement of the pressure member 5. The configuration of the stopper 10 can be other one than the triangle, e.g. an annular configuration.

According to some embodiments, since the movement of the pressure member 5 is limited by the stopper 10 (i.e. limiting means), it is possible to prevent disengagement of the connection between the pressure member 5 and the clutch member 4 during the axial movement of the pressure member 5. Since the stopper 10 (limiting means) abuts against the pressure member 5 when the pressure member 5 is axially moved a predetermined distance and limits a further axial movement thereof, it is possible to more reliably prevent the disengagement of the pressure member 5 from the clutch member 4 during an axial movement of the pressure member 5.

With reference to FIGS. 3 and 4, in some modifications, the stopper 10 can comprise a stopper 11 (FIGS. 3 and 4) projecting radially inward from the clutch housing (input member) 2. Similarly to the stopper 10, the stopper 11 can also limit the movement of the pressure member 5 and thereby prevent the disengagement of the pressure member 5 from the clutch member 4. Since the stopper 11 abuts against the pressure member 5 when the pressure member is axially moved a predetermined distance and limits a further axial movement thereof, it is possible to more reliably prevent the disengagement of the pressure member 5 from the clutch member 4 during an axial movement of the pressure member.

Similarly to the embodiments described above, further embodiments of the power transmitting apparatus can also be mounted on a vehicle such as a motorcycle to arbitrarily transmit or cut off the driving force of an engine to a transmission or a driving wheel. As shown in FIGS. 5-7, such embodiment can comprise an abutting surface 4b formed on the clutch member 4, and an abutting surface 5b formed on the pressure member 5 arranged oppositely to the abutting surface 4b. The clutch housing as the input member, driving clutch plates and the driven clutch plates etc. not shown in these drawings can be the same as those of the first embodiment and thus the detail descriptions of those components are not repeated below.

With continued reference to FIGS. 5-7, in some embodiments, the limiting means for limiting the movement of the pressure member 5 can be formed by the abutting surface 4b of the clutch member 4 and the abutting surface 5b of the pressure member 5. For example, when the pressure member 5 is rotated relative to the clutch member 4, the power transmitting apparatus is shifted from a condition of FIG. 6 to a condition of FIG. 7 by the action of the back-torque limiting cam formed by cam surfaces 4a, 5a. Thus the abutting surfaces 4b, 5b are abutted each other and further rotation of the pressure member 5 is limited and accordingly the axial movement (movement of the pressure member 5 toward a direction away from the clutch member 4) of the pressure member 5 is also limited.

Thus, in some embodiments, the axial movement of the pressure member 5 is limited by limiting the rotational movement of the pressure member 5 by the action of the abutting surfaces 4b, 5b of the back-torque limiting cams. Thus the disengagement of the pressure member 5 from its fitting engagement with the clutch member can be more reliably prevented.

According to some embodiments, since the further rotation of the pressure member 5 is limited by abutting the abutting surfaces 4b, 5b to each other, any other separate means for increasing the strength of the structural components is not required (although they may also be used) as compared for example with a structure in which a portion of the pressure member 5 is interfered with by boss portions (boss portions into which the bolts "B" are screwed) of the clutch member 4. Similarly to the embodiments described above, since the movement of the pressure member 5 is limited, it is possible to prevent the pressure member from being disengaged from its fitting engagement with the clutch member 4 during the axial movement of the pressure member 5 for releasing the power transmitting apparatus.

Although the present inventions have been described with reference to preferred embodiments, the present inventions are not limited to the embodiments disclosed above. For example, although the present inventions are illustrated and described in the context of power transmitting apparatuses provided with both the back-torque limiting cam and the pressure-contact assisting cams, power transmitting apparatuses including at least one of the present inventions can be include only the back-torque limiting cams. The present inventions can also be applied to power transmitting apparatuses of various multiple disc types used for automobiles, three and four wheeled buggies or various generalized machines other than motorcycles.

The present inventions can be applied to power transmitting apparatuses having different outline configurations or additional functions, for example, if they have a limiting means for limiting the movement of the pressure member.

Although these inventions have been disclosed in the context of certain preferred embodiments and examples, it will be understood by those skilled in the art that the present inventions extend beyond the specifically disclosed embodiments to other alternative embodiments and/or uses of the inventions and obvious modifications and equivalents thereof. In addition, while several variations of the inventions have been shown and described in detail, other modifications, which are within the scope of these inventions, will be readily apparent to those of skill in the art based upon this disclosure. It is also contemplated that various combination or sub-combinations of the specific features and aspects of the embodiments may be made and still fall within the scope of the inventions. It should be understood that various features and aspects of the disclosed embodiments can be combined with or substituted for one another in order to form varying modes of the disclosed inventions. Thus, it is intended that the scope of at least some of the present inventions herein disclosed should not be limited by the particular disclosed embodiments described above.

What is claimed is:

1. A power transmitting apparatus comprising:
   a clutch housing rotatable together with an input member and supporting a plurality of driving clutch plates;

a clutch member supporting a plurality of driven clutch plates alternately arranged between the driving clutch plates via spline fitting and connected to an output member;

a pressure member mounted on the clutch member so as to be axially movably therealong and configured to provide pressure-contact and release between the driving clutch plates and the driven clutch plates;

at least one clutch spring configured to bias the driving clutch plates toward the driven clutch plates and into pressure contact with each other; and back-torque limiting cams configured to release the connection between the driving clutch plates and the driven clutch plates when the rotation speed of the output member exceeds that of the input member;

wherein a rotational force input to the input member can be transmitted to the output member by pressure-contacting driving clutch plates and the driven clutch plates and the rotational force input to the input member can be cut-off from the output member by releasing the driving clutch plates and the driven clutch plates from each other; and means for limiting a movement of the pressure member toward a direction away from the clutch member.

2. A power transmitting apparatus of claim 1 wherein said means for limiting comprises a stopper which abuts against the pressure member when the pressure member is axially moved a predetermined distance.

3. A power transmitting apparatus of claim 2 wherein said stopper comprises a bearing plate for bearing one end of the at least one clutch spring normally urging the pressure member toward the clutch member, and wherein the bearing plate abuts against the pressure member when the pressure member is axially moved a predetermined distance relative to the clutch member and thereby limits a further axial movement of the pressure member.

4. A power transmitting apparatus of claim 1 wherein said limiting means comprises an abutting surface of the clutch member and an abutting surface of the pressure member which act each other to limit a movement in a rotational direction and thus a movement in an axial direction of the pressure member.

5. A power transmitting apparatus comprising:
a clutch housing rotatable together with an input member and supporting a plurality of driving clutch plates;

a clutch member supporting a plurality of driven clutch plates alternately arranged between the driving clutch plates via spline fitting and connected to an output member;

a pressure member mounted on the clutch member so as to be axially movably therealong and configured to provide pressure-contact and release between the driving clutch plates and the driven clutch plates; and at least one clutch spring configured to bias the driving clutch plates toward the driven clutch plates and into pressure contact with each other; and back-torque limiting cams configured to release the connection between the driving clutch plates and the driven clutch plates when the rotation speed of the output member exceeds that of the input member;

wherein a rotational force input to the input member can be transmitted to the output member by pressure-contacting driving clutch plates and the driven clutch plates and the rotational force input to the input member can be cut-off from the output member by releasing the driving clutch plates and the driven clutch plates from each other; and a retainer positioned to limit a movement of the pressure member toward a direction away from the clutch member.

6. A power transmitting apparatus of claim 5 wherein said retainer comprises a stopper which abuts against the pressure member when the pressure member is axially moved a predetermined distance.

7. A power transmitting apparatus of claim 6 wherein said stopper comprises a bearing plate for bearing one end of the at least one clutch spring normally urging the pressure member toward the clutch member, and wherein the bearing plate abuts against the pressure member when the pressure member is axially moved a predetermined distance relative to the clutch member and thereby limits a further axial movement of the pressure member.

8. A power transmitting apparatus of claim 5 wherein said retainer comprises an abutting surface of the clutch member and an abutting surface of the pressure member which act each other to limit a movement in a rotational direction and thus a movement in an axial direction of the pressure member.

* * * * *